United States Patent
Wang et al.

(10) Patent No.: US 10,904,064 B2
(45) Date of Patent: Jan. 26, 2021

(54) COMMUNICATION METHOD AND BASE STATION

(71) Applicant: HUAWEI TECHNOLOGIES CO., LTD., Guangdong (CN)

(72) Inventors: Xinyu Wang, Shenzhen (CN); Ding Ding, Xi'an (CN); Boyun Xie, Xi'an (CN); Hongjie Li, Shenzhen (CN); Xing Huang, Bucharest (RO)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/295,248

(22) Filed: Mar. 7, 2019

(65) Prior Publication Data

US 2019/0207798 A1    Jul. 4, 2019

Related U.S. Application Data

(63) Continuation of application No. PCT/CN2016/098362, filed on Sep. 7, 2016.

(51) Int. Cl.
| | | |
|---|---|---|
| H04L 27/26 | (2006.01) | |
| H04W 72/04 | (2009.01) | |
| H04W 28/00 | (2009.01) | |
| H04L 5/00 | (2006.01) | |
| H04L 5/14 | (2006.01) | |

(Continued)

(52) U.S. Cl.
CPC ........ *H04L 27/2691* (2013.01); *H04L 5/0073* (2013.01); *H04L 5/0092* (2013.01); *H04L 5/1469* (2013.01); *H04L 27/2607* (2013.01); *H04L 27/2666* (2013.01); *H04W 24/10* (2013.01); *H04W 28/00* (2013.01); *H04W 72/0426* (2013.01); *H04W 72/0446* (2013.01); *H04W 72/0453* (2013.01);

(Continued)

(58) Field of Classification Search
CPC combination set(s) only.
See application file for complete search history.

(56) References Cited

U.S. PATENT DOCUMENTS

| | | |
|---|---|---|
| 2011/0235555 A1 | 9/2011 | Zhang et al. |
| 2013/0208686 A1 | 8/2013 | Zhang et al. |

(Continued)

FOREIGN PATENT DOCUMENTS

| | | |
|---|---|---|
| CN | 101132223 A | 2/2008 |
| CN | 101425844 A | 5/2009 |

(Continued)

OTHER PUBLICATIONS

Shen et al., "Dynamic Uplink-Downlink Configuration and Interference Management in TD-LTE," IEEE Communications Magazine, vol .50, No. 11, Nov. 1, 2012, XP011472335, pp. 51-59.

(Continued)

*Primary Examiner* — Mandish K Randhawa
(74) *Attorney, Agent, or Firm* — Fish & Richardson P.C.

(57) ABSTRACT

Communication method and base stations are provided. One example includes determining, by a base station, that co-channel interference exists. For N consecutive symbols before a guard period (GP) in a special subframe in a radio frame, the base station sends a signal by using M1 middle resource blocks (RBs) of the N symbols, and reserves use of an RB other than the M1 RBs in the N symbols, where both N and M1 are positive integers.

17 Claims, 4 Drawing Sheets

501 — A base station determines that co-channel interference exists

502 — For N consecutive symbols before a GP in a special subframe in a radio frame, the base station sends a signal by using M1 middle RBs of the N symbols, and reserves use of an RB other than the M1 RBs in the N symbols, where both N and M1 are positive integers

(51) Int. Cl.
*H04W 72/08* (2009.01)
*H04W 24/10* (2009.01)

(52) U.S. Cl.
CPC ....... *H04W 72/082* (2013.01); *H04W 72/085* (2013.01); *H04W 72/0413* (2013.01)

(56) References Cited

U.S. PATENT DOCUMENTS

| | | |
|---|---|---|
| 2013/0286902 A1 | 10/2013 | Chen et al. |
| 2016/0128073 A1 | 5/2016 | Nagata et al. |
| 2016/0143042 A1 | 5/2016 | Nagata et al. |

FOREIGN PATENT DOCUMENTS

| | | | |
|---|---|---|---|
| CN | 101557276 A | | 10/2009 |
| CN | 102655652 A | | 9/2012 |
| CN | 102812768 A | | 12/2012 |
| CN | 105517044 A | | 4/2016 |
| CN | 105828338 A | | 8/2016 |
| JP | 2012095279 A | | 5/2012 |
| JP | 2013539304 A | | 10/2013 |
| JP | 2014236369 A | | 12/2014 |
| JP | 2015002403 A | | 1/2015 |
| JP | 2016006968 A | * | 1/2016 |
| KR | 20130020670 A | | 2/2013 |
| WO | 2015006940 A1 | | 1/2015 |

OTHER PUBLICATIONS

Extended European Search Report issued in European Application No. 16915452.3 dated Jun. 3, 2019, 7 pages.
International Search Report and Written Opinion issued in International Application No. PCT/CN2016/098362 dated May 31, 2017, 9 pages.
Office Action issued in Korean Application No. 10-2019-7008393 dated Oct. 22, 2019, 6 pages (With English Translation).
EPO Communication pursuant to Article 94(3) EPC issued in European Application No. 16915452.3 dated Apr. 24, 2020, 5 pages.
Samsung, "Downlink reference signal structure for TDD frame structure type 2," 3GPP TSG RAN WG1 Meeting #50bis, R1-074067; Shanghai, China, XP050107606, Oct. 8-12, 2007, 12 pages.
Samsung, "Downlink reference signal structure for TDD frame structure type 2," 3GPP TSG-RAN WG1 #50bis, R1-074067; Shanghai, China, Oct. 8-12, 2007, 12 pages.
CATT, "Usage of DwPTS for TDD," 3GPP TSG-RAN WG1 #52, R1-080800; Sorrento, Italy, Feb. 11-15, 2008, 3 pages.
Office Action issued in Japanese Application No. 2019-533262 dated Mar. 9, 2020, 7 pages (with English translation).
Office Action issued in Chinese Application No. 201680088594.3 dated Mar. 3, 2020, 14 pages (with English translation).

* cited by examiner

COMMUNICATION METHOD AND BASE STATION

CROSS-REFERENCE TO RELATED APPLICATIONS

This application is a continuation of International Application No. PCT/CN2016/098362, filed on Sep. 7, 2016, the disclosure of which is hereby incorporated by reference in its entirety.

TECHNICAL FIELD

This application relates to the field of communications technologies, and in particular, to a communication method and a base station.

BACKGROUND

In a mobile communications system in TDD (time division duplex) mode (referred to as a TDD system below), uplink transmission and downlink transmission are performed in a same frequency band, and an uplink signal and a downlink signal are differentiated by being sent in different time periods on a time axis. Because the uplink transmission and the downlink transmission are performed in the same frequency band, co-channel interference usually exists in the TDD system. For example, downlink transmission of a base station A and uplink reception of a base station B overlap in time, and because power of the downlink transmission is greater than power of the uplink transmission, the downlink transmission of the base station A interferes with the uplink reception of the base station B, resulting in severe deterioration in an uplink service of the base station B.

Currently, to reduce co-channel interference, time synchronization are kept between base stations. To be specific, air interfaces of the base stations keep aligned (or frames keep aligned), so that a possibility that the uplink transmission and the downlink transmission overlap in time is greatly reduced. However, due to factors such as weather, co-channel interference still exists between base stations that are spaced apart by a relatively long distance.

SUMMARY

Embodiments of this application provide a communication method and a base station, to reduce co-channel interference between base stations that are spaced apart by a relatively long distance in a TDD system.

According to a first aspect, an embodiment of this application provides a communication method, including:

determining, by a base station, that co-channel interference exists; and for N consecutive symbols before a GP in a special subframe in a radio frame, sending, by the base station, a signal by using M1 middle resource blocks (RBs) of the N symbols, and reserving use of RBs other than the M1 RBs in the N symbols, where both N and M1 are positive integers.

According to the foregoing method, after determining that co-channel interference occurs, the base station may send a signal by using only the M1 middle RBs of the N symbols before the GP in the special subframe, and reserve the use of the RB other than the M1 RBs in the N symbols, thereby reducing co-channel interference caused by the RB other than the M1 RBs in the N symbols to an uplink subframe of a remote base station, and reducing severe deterioration in a user service due to co-channel interference.

Optionally, the method further includes:

reserving, by the base station, use of M2 middle RBs of a target uplink subframe in the radio frame, where M2 is a positive integer greater than or equal to M1, and the target uplink subframe includes an uplink subframe adjacent to the special subframe, or includes an uplink subframe adjacent to the special subframe and an uplink subframe with an interval of at least one subframe from the special subframe.

According to the foregoing method, after determining that co-channel interference exists, the base station uses the M2 middle RBs of the target uplink subframe in the radio frame as reserved resource blocks, so that a most interference-prone resource block in the target uplink subframe is not scheduled to any terminal, and co-channel interference to the target uplink subframe is minimized.

Optionally, the determining, by a base station, that co-channel interference exists includes:

measuring, by the base station, M3 middle RBs of a received uplink subframe, to obtain a measurement result, where M3 is a positive integer less than or equal to M1; and determining, by the base station when the measurement result meets a preset co-channel interference condition, that co-channel interference exists.

Optionally, the preset co-channel interference condition includes at least one of the following:

in a plurality of consecutive detection periods, a difference between power of a first preset symbol and power of a second preset symbol in the M3 middle RBs of the uplink subframe received by the base station is greater than a first threshold; or in a plurality of consecutive detection periods, an average value of interference noise, in the M3 middle RBs, of all uplink subframes received by the base station is greater than a second threshold.

Optionally, the N symbols include at least one symbol in the special subframe; or the N symbols include at least one symbol in the special subframe and at least one symbol in a downlink subframe adjacent to the special subframe.

Optionally, the method further includes:

for the downlink subframe adjacent to the special subframe in each radio frame, reserving, by the base station, use of an RB other than M middle RBs in a symbol in the downlink subframe in the N symbols.

According to the foregoing method, the base station sends a signal only on the M middle RBs of the downlink subframe adjacent to the special subframe, so that interference from the downlink subframe sent by the base station to the uplink subframe of the remote base station is avoided, and interference to the uplink subframe of the remote base station is further reduced.

Optionally, the M1 middle RBs of the N symbols carry at least one of the following:

a cell-specific reference signal in the special subframe;

a synchronization signal in the special subframe;

a paging message in a downlink subframe;

system information in a downlink subframe;

a physical broadcast channel (PBCH) in a downlink subframe;

a synchronization signal in a downlink subframe; or a cell-specific reference signal in the first slot in a downlink subframe.

Optionally, M1 is equal to 6.

According to a second aspect, an embodiment of this application provides a base station, and the base station includes units or means for performing the steps in any method in the first aspect.

According to a third aspect, an embodiment of this application provides a base station, and the base station includes a processor and a memory. The memory is configured to store a program, and the processor invokes the program stored in the memory, to perform any method provided in the first aspect of the embodiments of this application.

According to a fourth aspect, this application provides a base station, including at least one processing element (or chip) for performing the method in the first aspect.

According to a fifth aspect, this application provides a computer program. The program is configured to perform any method in the first aspect when being executed by a processor.

According to a sixth aspect, a program product, such as a computer readable storage medium is provided, including the program in the fifth aspect.

DESCRIPTION OF EMBODIMENTS

The following describes the embodiments of this application in detail with reference to the accompanying drawings of the specification.

The embodiments of this application are applicable to a mobile communications system in TDD mode, for example, a mobile communications system such as a TDD-LTE (Long Term Evolution) system.

The following describes some terms in this application, to help a person skilled in the art have a better understanding.

(1) A terminal, also referred to as user equipment (UE), is a device for providing a user with voice and/or data connectivity, for example, a handheld device or an in-vehicle device having a wireless connection function. A common terminal includes, for example, a mobile phone, a tablet computer, a notebook computer, a palmtop computer, a mobile Internet device (MID), or a wearable device such as a smart watch, a smart band, or a pedometer.

(2) A base station, also referred to as a radio access network (RAN) device, is a device for connecting a terminal to a radio network, and includes but is not limited to: an evolved NodeB (eNB), a radio network controller (RNC), a NodeB (NB), a base station controller (BSC), a base transceiver station (BTS), a home eNodeB (for example, Home evolved NodeB or Home Node B, HNB), or a baseband unit (BBU). In addition, the base station may further include a Wi-Fi access point (AP), or the like.

(3) "A plurality of" refers to two or more than two. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects.

(4) In the embodiments of this application, a meaning of a symbol includes but is not limited to, an orthogonal frequency division multiplexing (OFDM) symbol, a sparse code multiple access (SCMA) symbol, a filtered orthogonal frequency division multiplexing (F-OFDM) symbol, or a non-orthogonal multiple access (NOMA) symbol, and may be specifically determined based on an actual situation. Details are not described herein.

Figure 1:
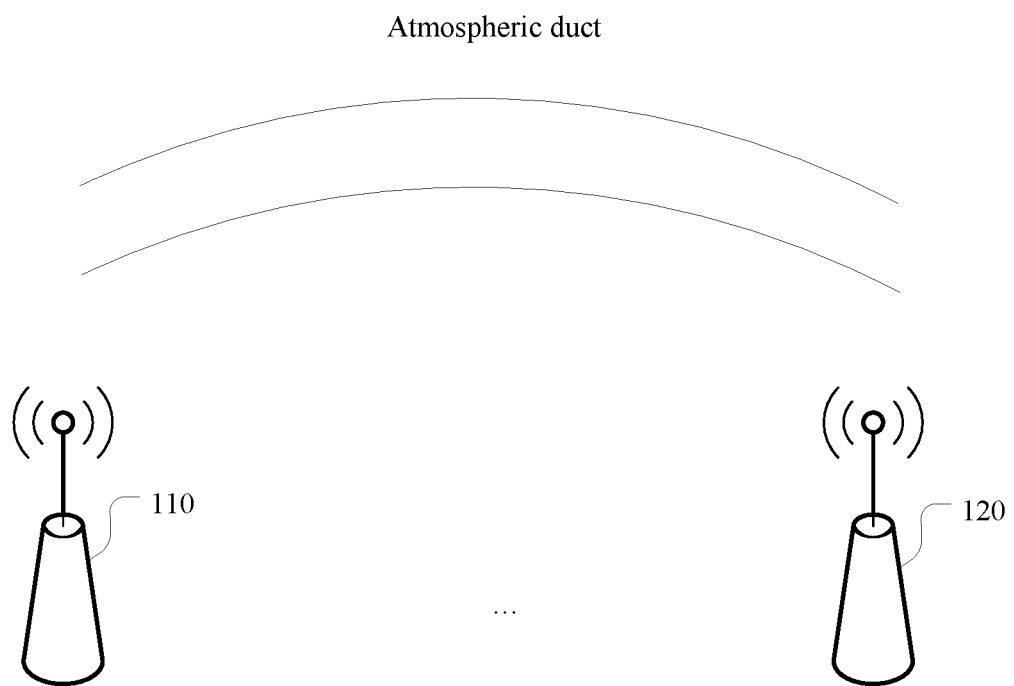
FIG. 1 is a schematic diagram of a TDD communications system according to an embodiment of this application.

Referring to FIG. 1, FIG. 1 is a schematic diagram of a TDD communications system according to an embodiment of this application. As shown in FIG. 1, the communications system includes a base station 110 and a base station 120, and the base station 110 and the base station 120 are spaced apart by a relatively long distance. Theoretically, because of the long distance, the base station 110 and the base station 120 do not interfere with each other. However, in practice, it is found that in some cases, very severe co-channel interference exists between the base station 110 and the base station 120, causing a failure to access or perform a normal service by terminals in a vast range of networks.

This situation is usually caused by an atmospheric duct. The atmospheric duct is an effect in which the atmosphere refracts an electromagnetic wave in a weather condition. Under the effect of the atmospheric duct, an electromagnetic wave propagates as if in a waveguide, has an extremely low propagation loss (which is similar to free space propagation), and can go beyond the horizontal plane to implement trans-horizon transmission. The reason is that when temperature inversion occurs or water vapor reduces sharply at a layer of the troposphere of the Earth's atmosphere, density and a refractive index of air change significantly in the vertical direction, and super-refraction propagation of radio-wave rays is caused. Electromagnetic energy of the radio-wave rays is reflected back and forth between the upper and lower walls of the atmosphere at this layer while propagating forward, as if proceeding within a waveguide. An atmospheric ducting layer may be an atmospheric layer close to the ground or may be an atmospheric layer above the ground.

Figure 2:
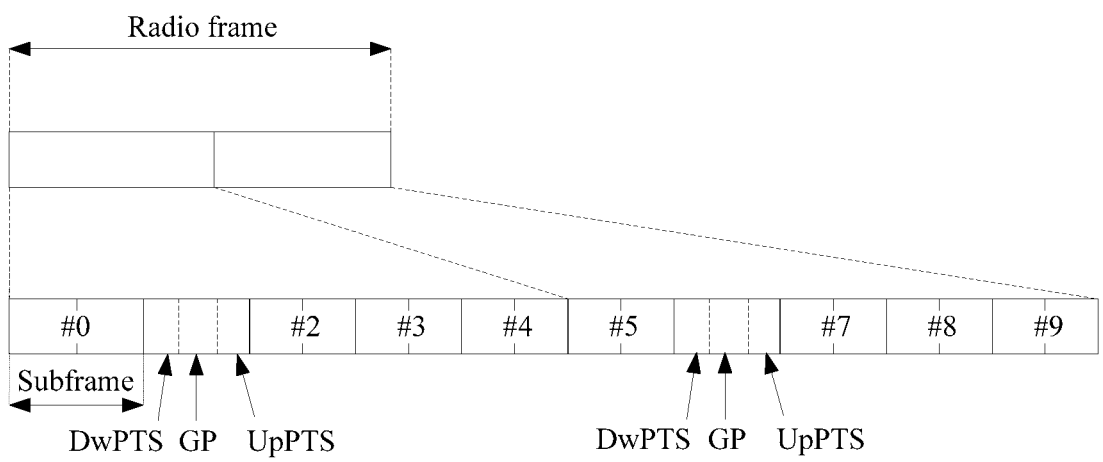
FIG. 2 is a schematic diagram of a TDD frame structure according to an embodiment of this application.
Figure 3:
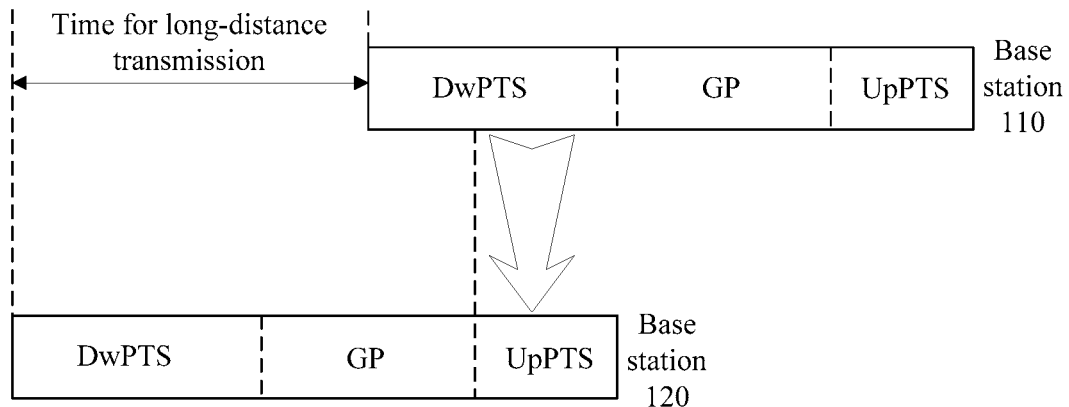
FIG. 3 is a schematic diagram of co-channel interference according to an embodiment of this application.

The following describes how the atmospheric duct causes co-channel interference of the TDD system with reference to FIG. 2 and FIG. 3. FIG. 2 is a schematic diagram of a TDD frame structure according to an embodiment of this application. FIG. 3 is a schematic diagram of co-channel interference according to an embodiment of this application.

As shown in FIG. 2, a radio frame of TDD includes 10 subframes, which are marked by numbers #0 to #9, respectively. With reference to Table 1, currently, there are seven uplink-downlink configurations in the TDD system. A subframe used to transmit a downlink signal is a downlink subframe, represented by D. A subframe used to transmit an uplink signal is an uplink subframe, represented by U. A downlink subframe and an uplink subframe are separated by a special subframe, which is represented by S. A special subframe includes three parts: a downlink pilot timeslot (DwPTS), a guard period (GP), and an uplink pilot timeslot (UpPTS), where DwPTS is a downlink timeslot in the special subframe, UpPTS is an uplink timeslot in the special subframe, and GP is a guard time. Quantities of OFDM symbols occupied by the DwPTS, the GP, and the UpPTS are configurable. For details, refer to Table 2. Table 2 shows respective quantities of symbols occupied by the DwPTS, the GP, and the UpPTS in the special subframe in different configurations in cases of a normal CP (cyclic prefix) and an extended CP.

TABLE 1

| Uplink-downlink configuration (Uplink-downlink configuration) | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | S | S | S |

TABLE 2

| Special subframe configuration | Normal CP | | | Extended CP | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | — | — | — |
| 8 | 11 | 1 | 2 | — | — | — |

Figure 4:
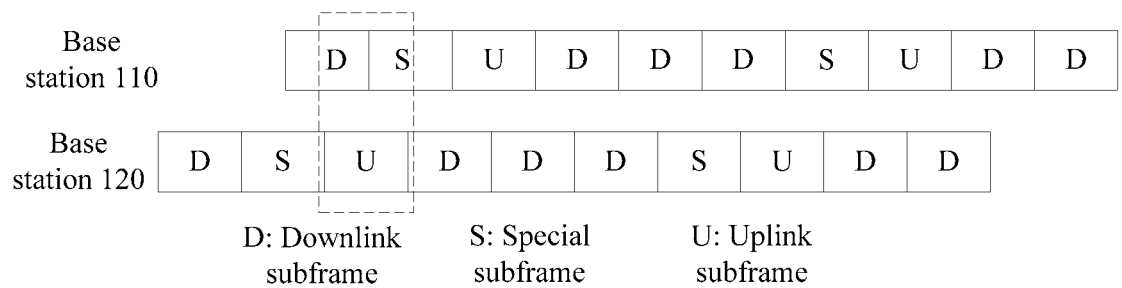
FIG. 4 is a schematic diagram of interference from a remote base station to a local base station in the prior art.

As shown in FIG. 3, a high-power downlink signal of the base station 110 can be transmitted to the base station 120 through an atmospheric duct for a long distance. Because a time for long-distance transmission exceeds the GP of the TDD system, and the downlink signal of the base station 110 is received by the base station 120 in a receiving timeslot of the base station 120, uplink reception of the base station 120 is interfered, causing long-distance co-channel interference of the TDD system. In addition, such interference is usually interference to all frequency bands and has impact in a wide range. As shown in FIG. 4, a downlink subframe D of the base station 110 even "drifts" to a slot corresponding to an uplink subframe of the base station 120, and interferes with the uplink reception of the base station 120.

Co-channel interference between base stations that are spaced apart by a relatively long distance is referred to as remote co-channel interference below. In addition, one base station is referred to as a remote base station, and the other base station is referred to as a local base station. For example, the base station 110 is the remote base station, and the base station 120 is the local base station. Certainly, it may alternatively be that the base station 120 is referred to as the remote base station, and the base station 110 is referred to as the local base station. In addition, the base station 120 and the base station 110 interferes with each other mutually.

It can be learned that remote co-channel interference occurs between base stations that are spaced apart by a very long distance, for example, base stations spaced apart by a distance of 200 km to 400 km. Because transmit power of a base station is far greater than transmit power of a terminal, remote co-channel interference is mainly characterized by interference from a downlink signal of the remote base station to an uplink signal of the local base station. Specifically, as a propagation distance increases, after the downlink signal of the remote base station reaches an intra-frequency local base station after a propagation delay, asynchronization occurs between the originally synchronized uplink signal and downlink signal. Therefore, the downlink signal of the remote base station interferes with the uplink signal of the local base station, causing severe deterioration in an uplink service of the local base station, and affecting normal work of the local base station. Remote co-channel interference in the TDD system is caused by many factors. For example, under the effect of the "atmospheric duct", an electromagnetic wave propagates as if in a waveguide, has an extremely low propagation loss (which is similar to free space propagation), and can go beyond the horizontal plane to implement trans-horizon transmission. When the "atmospheric duct" exists, the high-power downlink signal of the remote base station can be transmitted for a long distance to reach the local base station. Because the time for long-distance transmission exceeds the GP of the TDD system, and the downlink signal of the remote base station is received by the local base station in a receiving timeslot of the uplink signal of the local base station, reception of the uplink signal of the local base station is interfered.

Currently, in a case of extremely severe remote co-channel interference, special subframe configuration is modified, to extend a GP in time domain. For example, the special subframe configuration is modified to 3:9:2 shown in Table 2. In this case, there are nine symbols of GPs, and this has a suppression effect on remote co-channel interference of 200 km. However, co-channel interference from a base station beyond 200 km still cannot be canceled.

Based on the foregoing descriptions, an embodiment of this application provides a communication method. In this method, when co-channel interference exists, for N consecutive symbols before a GP in a special subframe, a base station sends a signal by using only a plurality of middle resource blocks (RB) of the N symbols, and reserves use of RBs other than the plurality of RBs in the N symbols, where N is a positive integer. Because only some RBs in the N symbols are used to send a signal, interference from the reserved RBs to another base station may be ignored, and co-channel interference is reduced substantially.

Figure 5:
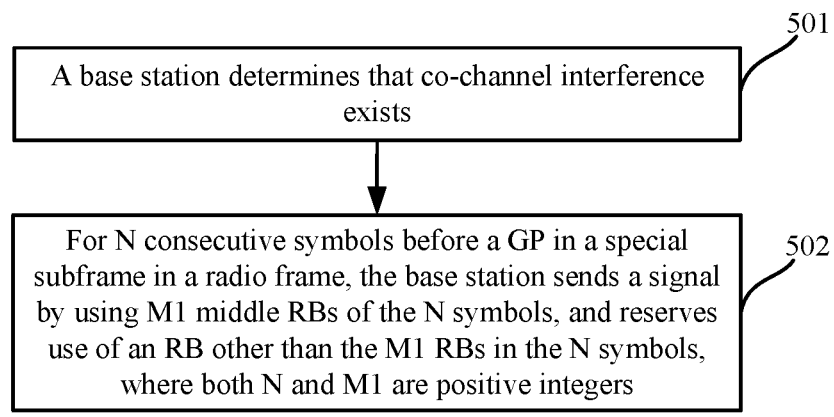
FIG. 5 is a schematic flowchart of a communication method according to an embodiment of this application.

Referring to FIG. 5, FIG. 5 is a schematic flowchart of a communication method according to an embodiment of this application.

As shown in FIG. 5, the method may include the following steps:

Step 501: A base station determines that co-channel interference exists.

Step 502: For N consecutive symbols before a GP in a special subframe in a radio frame, the base station sends a signal by using M1 middle RBs of the N symbols, and reserves use of RBs other than the M1 RBs in the N symbols, where both N and M1 are positive integers.

In step 501, co-channel interference is remote co-channel interference, which is also referred to as long-distance co-channel interference.

The base station may determine existence of co-channel interference by using an existing method. For example, in a plurality of consecutive detection periods, if the base station determines that in all symbols of a received uplink subframe, power decreases progressively from the first symbol to the last symbol, the base station determines that co-channel interference exists. In addition, this embodiment of this application further provides the following methods to determine the existence of co-channel interference, but this application does not limit a manner of determining co-channel interference.

The base station may measure M3 middle RBs of a received uplink subframe, to determine whether co-channel interference exists, where M3 is a positive integer less than or equal to M1. Specifically, the following steps may be included.

Step 1: The base station may measure M3 middle RBs of a received uplink subframe, to obtain a measurement result, where M3 is a positive integer less than or equal to M1.

Specifically, the base station may measure power of two preset symbols in the M3 middle RBs of the received uplink subframe, for example, power of a first preset symbol and power of a second preset symbol. Alternatively, the base station may measure interference noise, in the M3 middle RBs, of each received uplink subframe. Certainly, the foregoing is merely an example. Alternatively, the base station may measure other content, and details are not described herein.

With reference to the foregoing descriptions, in this embodiment of this application, the measurement result obtained by the base station may include at least one of the following:

the power of the first preset symbol and the power of the second preset symbol in the M3 middle RBs of the uplink subframe received by the base station; or the interference noise, in the M3 middle RBs, of the uplink subframe received by the base station.

It should be noted that, details of how the base station measures the power of the first preset symbol and the power of the second preset symbol in the M3 middle RBs of the uplink subframe are not limited in this embodiment of this application, and are not described herein. In addition, details of how the base station measures the interference noise, in the M3 middle RBs, of each uplink subframe are not limited in this embodiment of this application.

Optionally, in this embodiment of this application, the first preset symbol and the second preset symbol may be determined based on an actual situation. For example, the first preset symbol is symbol 0 in the M3 middle RBs of the uplink subframe, and the second preset symbol is symbol 11 in the M3 middle RBs of the uplink subframe. Certainly, the first preset symbol may also be symbol 1 in the M3 middle RBs of the uplink subframe, and the second preset symbol may also be symbol 10 in the M3 middle RBs of the uplink subframe; and so on. Details are not described herein.

Correspondingly, in this embodiment of this application, a value of M1 may be determined based on an actual situation. For example, the value of M1 may be 6, and certainly M1 may be another value. Examples are not described one by one herein.

Step 2: The base station determines, when the measurement result meets a preset co-channel interference condition, that co-channel interference exists.

In this embodiment of this application, the preset co-channel interference condition includes at least one of the following:

in the plurality of consecutive detection periods, a difference between the power of the first preset symbol and the power of the second preset symbol in the M3 middle RBs of the uplink subframe received by the base station is greater than a first threshold; or in the plurality of consecutive detection periods, an average value of the interference noise, in the M3 middle RBs, of all uplink subframes received by the base station is greater than a second threshold.

The first threshold and the second threshold may be determined based on an actual situation, and details are not described herein. In each detection period, the base station may receive at least one uplink subframe.

It should be noted that, after detecting the uplink subframe, if the base station determines that the measurement result does not meet the preset co-channel interference condition, the base station may determine that co-channel interference does not occur. In this case, the base station may send the radio frame in a manner specified in an existing standard.

In step 502, a value of N is determined based on a distance between two base stations in co-channel interference. A larger distance leads to a larger value of N. Optionally, when the distance between the two base stations is within 250 km, the N symbols may only include at least one symbol in the special subframe; or when the distance between the two base stations is greater than 250 km, the N symbols may further include at least one symbol in a downlink subframe adjacent to the special subframe.

In this embodiment of this application, that the base station reserves use of RBs other than the M1 RBs in the N symbols may mean that the base station does not transmit a signal on the RBs other than the M1 RBs in the N symbols. Optionally, when reserving the use of the RBs other than the M1 RBs in the N symbols, the base station reserves use of at least 90% of REs (resource element) in the RBs other than the M1 RBs in the N symbols.

Figure 6:
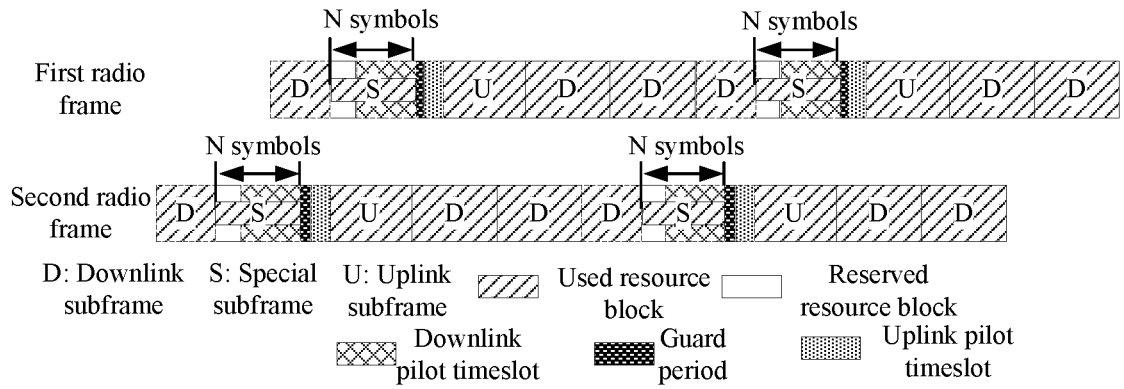
FIG. 6 is a schematic diagram of resource scheduling according to an embodiment of this application.

For example, with reference to the foregoing descriptions, as shown in FIG. 6, FIG. 6 is a schematic diagram of resource scheduling according to an embodiment of this application. In FIG. 6, a first radio frame and a second radio frame are radio frames of a remote base station and a local base station, respectively. Subframe configuration modes of the first radio frame and the second radio frame are mode 2. For other subframe configuration modes, refer to the descriptions of FIG. 6, and details are not described herein.

In FIG. 6, the first radio frame and the second radio frame should be two radio frames sent synchronously. Due to an atmospheric duct, the first radio frame and the second radio frame become asynchronous, and a subframe 1 of the first radio frame (the subframe is a special subframe) and a subframe 2 of the second radio frame (the subframe is an uplink subframe) overlap. Therefore, the special subframe of the first radio frame causes co-channel interference to the uplink subframe of the second radio frame.

After determining that co-channel interference occurs, for the N consecutive symbols before the GP in the special subframe in the radio frame, the base station sends a signal by using only the M1 middle resource blocks of the N symbols, and reserves the use of the resource blocks other than the M1 resource blocks in the N symbols. In other words, the base station does not send a signal by using the resource blocks other than the M1 resource blocks in the N symbols. With reference to FIG. 6, a filled area is a resource block used when the base station sends a signal; an unfilled area is a resource block reserved by the base station, namely, a resource block that is not used.

According to the foregoing method, after determining that co-channel interference occurs, the base station may send a signal by using only the M1 middle RBs of the N symbols before the GP in the special subframe, and reserve the use of the RBs other than the M1 RBs in the N symbols, thereby reducing co-channel interference caused by the RBs other than the M1 RBs in the N symbols to an uplink subframe of a remote base station, and reducing severe deterioration in a user service due to co-channel interference.

Optionally, in this embodiment of this application, for the special subframe in the radio frame, the base station may only send a cell-specific reference signal (cell reference signal, CRS) and a synchronization signal by using the M1 middle RBs of the N symbols in the special subframe.

According to the foregoing method, the base station only sends the cell-specific reference signal and the synchronization signal by using the M1 middle RBs of the N symbols in the special subframe, so that co-channel interference caused by the special subframe sent by the base station is reduced, and meanwhile a basic service of a cell is not affected.

It should be noted that, in the foregoing step 501, the base station determines existence of co-channel interference by determining co-channel interference from another base station to the base station. Co-channel interference is mutual, and when suffering co-channel interference from another base station, the base station also causes co-channel interference to the another base station. Therefore, co-channel interference to the another base station may be reduced by reserving use of some RBs. Further, the base station may reserve use of some interference-prone RBs in the uplink subframe. In this way, scheduling of the uplink signal and the downlink signal is staggered in frequency domain, thereby further reducing co-channel interference from the another base station to the base station, and resolving deterioration in an uplink service caused by severe remote interference.

Relative to the embodiment shown in FIG. 5, the following steps are further included:

The base station reserves use of M2 middle RBs of a target uplink subframe in the radio frame, the target uplink subframe includes an uplink subframe adjacent to the special subframe, or further includes an uplink subframe with an interval of at least one subframe from the special subframe.

In this step, the base station uses the M2 middle RBs of the target uplink subframe in the radio frame as reserved RBs and does not schedule the reserved RBs to any terminal, where M2 is a positive integer greater than or equal to M1.

It can be learned from Table 1 that, in a radio frame, a special subframe is adjacent to an uplink subframe, and therefore, when co-channel interference occurs, it is highly possible that the uplink subframe and the special subframe interfere with each other. In addition, because transmit power of a base station is far greater than transmit power of a terminal, interference from an uplink subframe to a special subframe may be ignored, and interference that ultimately needs to be canceled is interference from the special subframe to the uplink subframe.

According to the foregoing method, after determining that co-channel interference exists, the base station uses the M2 middle RBs of the target uplink subframe in the radio frame as reserved resource blocks, so that a most interference-prone resource block in the target uplink subframe is not scheduled to any terminal, and co-channel interference to the target uplink subframe is minimized.

Figure 7:
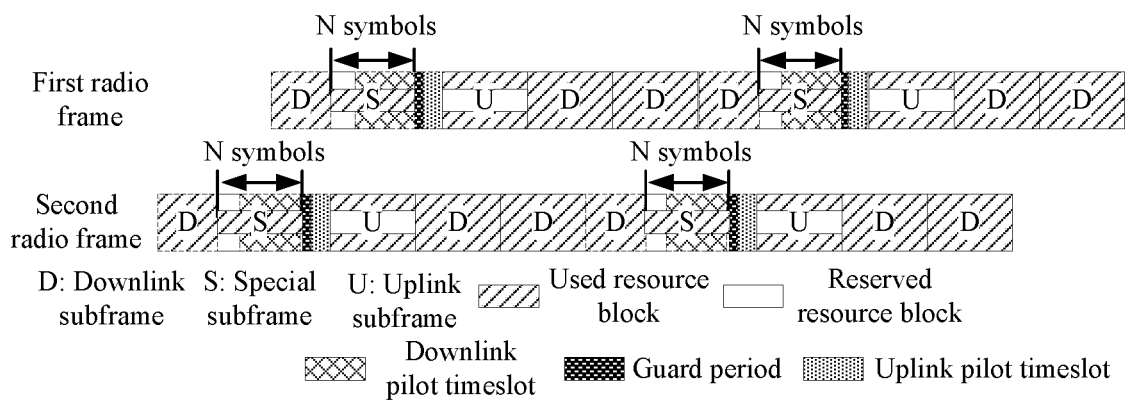
FIG. 7 is a schematic diagram of resource scheduling according to an embodiment of this application.

For example, as shown in FIG. 7, FIG. 7 is a schematic diagram of resource scheduling according to an embodiment of this application. In FIG. 7, a first radio frame and a second radio frame are radio frames of a remote base station and a local base station, respectively. Subframe configuration modes of the first radio frame and the second radio frame are mode 2. For other subframe configuration modes, refer to the descriptions of FIG. 7, and details are not described herein.

In FIG. 7, the first radio frame and the second radio frame should be two radio frames sent synchronously. Due to an atmospheric duct, the first radio frame and the second radio frame become asynchronous, and a subframe 1 of the first radio frame (the subframe is a special subframe) and a subframe 2 of the second radio frame (the subframe is an uplink subframe) overlap. Therefore, the special subframe of the first radio frame causes co-channel interference to the uplink subframe of the second radio frame. After determining that co-channel interference occurs, for the N consecutive symbols before the guard period in the special subframe in the radio frame, the base station reserves use of the resource blocks other than the M1 resource blocks in the N symbols. In addition, the base station uses M2 RBs of the target uplink subframe in the radio frame as reserved resource blocks and does not schedule the reserved resource blocks to any terminal. In other words, the base station does not send a signal by using the M2 middle RBs of the target uplink subframe. With reference to FIG. 7, a filled area is a resource block used when the base station sends a signal; an unfilled area is a resource block reserved by the base station, namely, a resource block that is not used.

Further, after determining that co-channel interference exists, for the downlink subframe adjacent to the special subframe in the radio frame, the base station reserves use of RBs other than the M1 middle RBs of a symbol, in the downlink subframe, of the N symbols. In other words, the base station sends a signal by using only the M1 middle RBs of the symbol, in the downlink subframe, in the N symbols.

Figure 8:
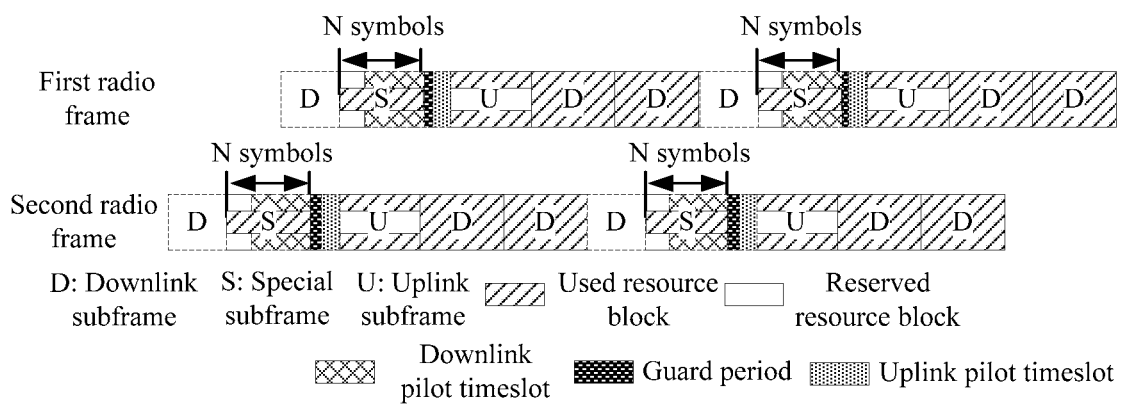
FIG. 8 is a schematic diagram of resource scheduling according to an embodiment of this application.

For example, as shown in FIG. 8, FIG. 8 is a schematic diagram of resource scheduling according to an embodiment of this application. In FIG. 8, a first radio frame and a second radio frame are radio frames of a remote base station and a local base station, respectively. Subframe configuration modes of the first radio frame and the second radio frame are mode 2. For other subframe configuration modes, refer to the descriptions of FIG. 8, and details are not described herein.

In FIG. 8, the first radio frame and the second radio frame should be two radio frames sent synchronously. Due to an atmospheric duct, the first radio frame and the second radio frame become asynchronous, and a subframe 1 of the first radio frame (the subframe is a special subframe) and a subframe 2 of the second radio frame (the subframe is an uplink subframe) overlap. Therefore, the special subframe of the first radio frame causes co-channel interference to the uplink subframe of the second radio frame. After determining that co-channel interference occurs, for the N consecutive symbols before the guard period in the special subframe in the radio frame, the base station reserves use of the resource block other than the M1 resource blocks in the N symbols. In addition, the base station sends a signal only on M middle RBs of the downlink subframe adjacent to the special subframe, and does not use other RBs other than the M middle RBs of the downlink subframe adjacent to the special subframe. With reference to FIG. 8, a filled area is a resource block used when the base station sends a signal; an unfilled area is a resource block reserved by the base station, namely, a resource block that is not used.

Optionally, for the downlink subframe adjacent to the special subframe in the radio frame, the base station sends a paging message, system information, a physical broadcast channel (PBCH), a synchronization signal, and cell-specific reference signal of the first slot only on the M middle RBs of the downlink subframe adjacent to the special subframe.

According to the foregoing method, the base station sends a signal only on the M middle RBs of the downlink subframe adjacent to the special subframe, so that interference from the downlink subframe sent by the base station to the uplink subframe of the remote base station is avoided, and interference to the uplink subframe of the remote base station is further reduced.

Based on a same technical concept, an embodiment of this application further provides a base station. The base station can perform the method procedures described in FIG. 5.

Figure 9:
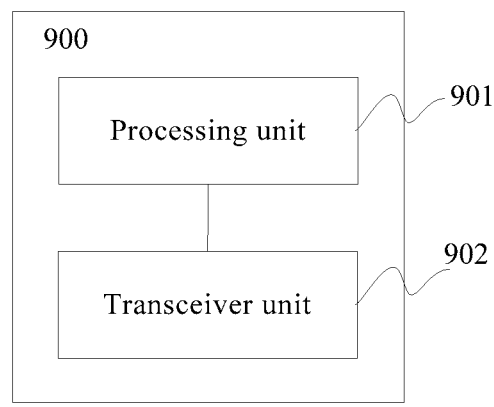
FIG. 9 is a schematic structural diagram of a base station according to an embodiment of this application.

As shown in FIG. 9, FIG. 9 is a schematic structural diagram of a base station according to an embodiment of this application.

With reference to FIG. 9, the base station 900 includes:
a processing unit 901, configured to determine that co-channel interference exists; and
a transceiver unit 902, configured to send, for N consecutive symbols before a guard period (GP) in a special subframe in a radio frame, a signal by using M1 middle resource blocks (RBs) of the N symbols, and reserve use of RBs other than the M1 RBs in the N symbols, where both N and M1 are positive integers.

Optionally, the transceiver unit 902 is further configured to:
reserve use of M2 middle RBs of a target uplink subframe in the radio frame, where M2 is a positive integer greater than or equal to M1, and the target uplink subframe includes an uplink subframe adjacent to the special subframe, or includes an uplink subframe adjacent to the special subframe and an uplink subframe with an interval of at least one subframe from the special subframe.

Optionally, the processing module 901 is specifically configured to:
measure M3 middle RBs of a received uplink subframe, to obtain a measurement result, where M3 is a positive integer less than or equal to M1; and
determine, when the measurement result meets a preset co-channel interference condition, that co-channel interference exists.

Optionally, the preset co-channel interference condition includes at least one of the following:
in a plurality of consecutive detection periods, a difference between power of a first preset symbol and power of a second preset symbol in the M3 middle RBs of the received uplink subframe is greater than a first threshold; or
in a plurality of consecutive detection periods, an average value of interference noise, in the M3 middle RBs, of all received uplink subframes is greater than a second threshold.

Optionally, the N symbols include at least one symbol in the special subframe; or the N symbols include at least one symbol in the special subframe and at least one symbol in a downlink subframe adjacent to the special subframe.

Optionally, the M1 middle RBs of the N symbols carry at least one of the following:
a cell-specific reference signal in the special subframe;
a synchronization signal in the special subframe;
a paging message in a downlink subframe;
system information in a downlink subframe;
a physical broadcast channel (PBCH) in a downlink subframe;
a synchronization signal in a downlink subframe; or
a cell-specific reference signal in the first slot in a downlink subframe.

Optionally, M1 is equal to 6.

It should be understood that division of the units of the base station is merely logical function division, and in actual implementation, some or all of the units may be integrated into a physical entity, or may be physically separate. In addition, these units may all be implemented in a form of software being invoked by a processing element, or may all be implemented in a hardware form. Alternatively, some units are implemented in a form of software being invoked by a processing element, and the other units are implemented in a hardware form. For example, the processing unit may be a separate processing element, or may be integrated in a chip of the base station, or may be stored in a memory of the base station in a form of a program, and invoked by a processing element of the base station to perform functions of the foregoing units. Implementation of another unit is similar thereto. In addition, some or all of these units may be integrated or may be independently implemented. The processing element herein may be an integrated circuit having a signal processing capability. In an implementation process, the steps of the foregoing method or the foregoing units may be completed by a hardware integrated logic circuit in a processor element or an instruction in a form of software.

For example, the foregoing units may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing units is implemented in a form of a processing element invoking a program, the processing element may be a general purpose processor, such as a central processing unit (CPU) or another processor that can invoke a program. For another example, these units may be integrated and implemented in a form of a system-on-a-chip (SOC).

Based on a same technical concept, an embodiment of this application further provides a base station, and the base station can perform the method procedures described in FIG. 5.

Figure 10:
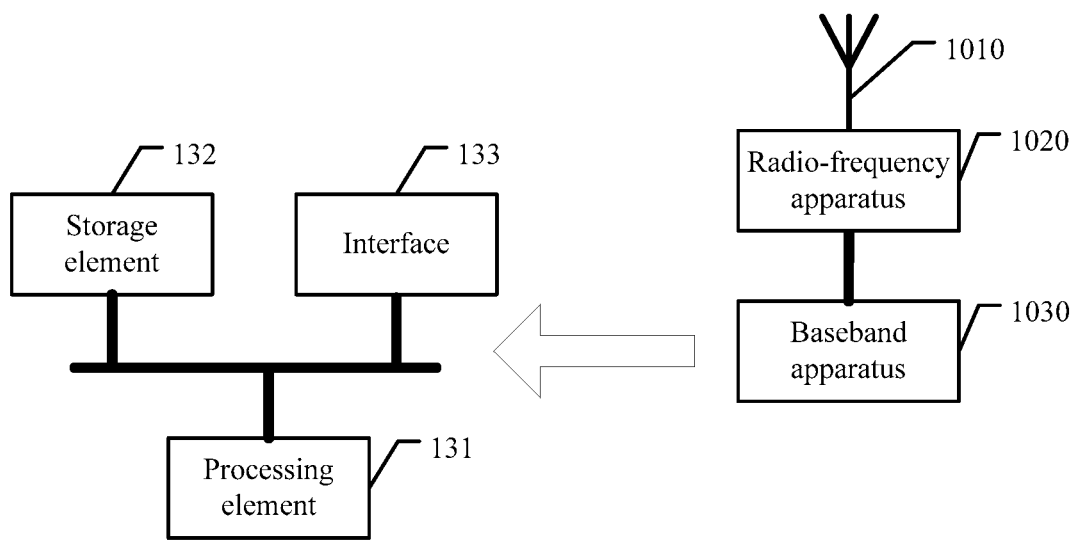
FIG. 10 is a schematic structural diagram of a base station according to an embodiment of this application.

As shown in FIG. 10, FIG. 10 is a schematic structural diagram of a base station according to an embodiment of this application.

Referring to FIG. 10, the base station includes: an antenna 1010, a radio-frequency apparatus 1020, and a baseband apparatus 1030. The antenna 1010 is connected to the radio-frequency apparatus 1020. In an uplink direction, the radio-frequency apparatus 1020 receives, through the antenna 1010, information sent by a terminal, and sends, to the baseband apparatus 1030 for processing, the information sent by the terminal. In a downlink direction, the baseband apparatus 1030 processes the information for the terminal, and sends the information to the radio-frequency apparatus 1020. The radio-frequency apparatus 1020 processes the information for the terminal, and sends the information to the terminal through the antenna 1010.

The baseband apparatus 1030 is configured to: determine that co-channel interference exists, and for N consecutive symbols before a guard period (GP) in a special subframe in a radio frame, send a signal by using M1 middle resource blocks (RBs) of the N symbols, and reserve use of RBs other than the M1 RBs in the N symbols, where both N and M1 are positive integers. The baseband apparatus 1030 may send a signal through the radio-frequency apparatus 1020

Optionally, the baseband apparatus 1030 is further configured to:

reserve use of M2 middle RBs of a target uplink subframe in the radio frame, where M2 is a positive integer greater than or equal to M1, and the target uplink subframe includes an uplink subframe adjacent to the special subframe, or includes an uplink subframe adjacent to the special subframe and an uplink subframe with an interval of at least one subframe from the special subframe.

Optionally, the baseband apparatus 1030 may be specifically configured to perform the following operations to determine existence of co-channel interference:

measuring M3 middle RBs of a received uplink subframe, to obtain a measurement result, where M3 is a positive integer less than or equal to M1; and determining, when the measurement result meets a preset co-channel interference condition, that co-channel interference exists.

Optionally, the preset co-channel interference condition includes at least one of the following:

in a plurality of consecutive detection periods, a difference between power of a first preset symbol and power of the second preset symbol in the M3 middle RBs of the received uplink subframe is greater than a first threshold; or in a plurality of consecutive detection periods, an average value of interference noise, in the M3 middle RBs, of all received uplink subframes is greater than a second threshold.

Optionally, the N symbols include at least one symbol in the special subframe; or the N symbols include at least one symbol in the special subframe and at least one symbol in a downlink subframe adjacent to the special subframe.

Optionally, the M1 middle RBs of the N symbols carry at least one of the following:

a cell-specific reference signal in the special subframe;
a synchronization signal in the special subframe;
a paging message in a downlink subframe;
system information in a downlink subframe;
a physical broadcast channel (PBCH) in a downlink subframe;
a synchronization signal in a downlink subframe; or
a cell-specific reference signal in the first slot in a downlink subframe.

Optionally, M1 is equal to 6.

The units shown in FIG. 9 may be located in the baseband apparatus 1030. In an implementation, the foregoing units are implemented in a form of a processing element invoking a program. For example, the baseband apparatus 1030 includes a processing element 131 and a storage element 132. The processing element 131 invokes a program stored in the storage element 132, to perform the method in the foregoing method embodiment. In addition, the baseband apparatus 1030 may further include an interface 133, configured to exchange information with the radio-frequency apparatus 1020. The interface is, for example, a common public radio interface (CPRI).

In another implementation, the units shown in FIG. 9 may be configured into one or more processing elements for implementing the foregoing method, and these processing elements are disposed on the baseband apparatus 1030. The processing element herein may be an integrated circuit, for example, one or more ASICs, or one or more DSPs, or one or more FPGAs. These integrated circuits may be integrated, to form a chip.

For example, the units shown in FIG. 9 may be integrated and implemented in a form of a system-on-a-chip. For example, the baseband apparatus 1030 includes an SOC chip, to implement the foregoing method. The chip may integrate the processing element 131 and the storage element 132, to implement functions of the foregoing method or the foregoing units in a form of the processing element 131 invoking a program stored in the storage element 132. Alternatively, the chip may integrate at least one integrated circuit, to implement functions of the foregoing method or the foregoing units. Alternatively, with reference to the foregoing implementations, functions of some units are implemented in a form of a processing element invoking a program, and functions of some units are implemented in a form of an integrated circuit.

In conclusion, regardless of which manner is used, the foregoing apparatus includes at least one processing element, a storage element, and a communications interface. The at least one processing element is configured to perform the method provided in the foregoing method embodiment. The processing element may perform some or all of the steps in the foregoing method embodiment in a first manner, that is, by executing the program stored in the storage element; or may perform some or all of the steps in the foregoing method embodiment in a second manner, that is, by using a hardware integrated logic circuit in a processor element in combination with an instruction; or certainly may perform the method provided in the foregoing method embodiment by combining the first manner and the second manner.

As described above, the processing element 131 herein may be a general purpose processor, such as a central processing unit, or may be one or more integrated circuits configured to implement the foregoing method, such as one or more application-specific integrated circuits, or one or more microprocessors, or one or more field programmable gate arrays.

The storage element 132 may be a memory, or may be a collective name for a plurality of storage elements.

Optionally, FIG. 10 may further include an interface, and the interface may include any quantity of interconnected buses and bridges, which are specifically linked by circuits of one or more processors represented by the processor and a memory represented by the memory. The interface may further link other circuits of, for example, a peripheral device, a voltage regulator, and a power management circuit, which are all known in the art, and therefore, details are not further described in this specification.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of any other programmable data processing device to generate a machine instruction, so that the instructions executed by a computer or a processor of any other programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Obviously, a person skilled in the art may make various modifications and variations to this application without departing from the spirit and scope of this application. This application is intended to cover these modifications and variations of this application provided that they fall within the scope of protection defined by the following claims and their equivalent technologies.

What is claimed is:

1. A communication method, wherein the method comprises:
   determining, by a base station, that co-channel interference exists;
   for N consecutive symbols before a guard period (GP) in a special subframe in a radio frame, sending, by the base station, a signal by using M1 middle resource blocks (RBs) of the N symbols, and reserving use of RBs other than the M1 RBs in the N symbols, wherein both N and M1 are positive integers; and
   reserving, by the base station, use of M2 middle RBs of a target uplink subframe in the radio frame, wherein M2 is a positive integer greater than or equal to M1, and wherein the target uplink subframe comprises:
   an uplink subframe adjacent to the special subframe; or
   an uplink subframe adjacent to the special subframe and an uplink subframe with an interval of at least one subframe from the special subframe.

2. The method according to claim 1, wherein the determining, by a base station, that co-channel interference exists comprises:
   measuring, by the base station, M3 middle RBs of a received uplink subframe, to obtain a measurement result, wherein M3 is a positive integer less than or equal to M1; and
   determining, by the base station that co-channel interference exists when the measurement result meets a preset co-channel interference condition.

3. The method according to claim 2, wherein the preset co-channel interference condition comprises at least one of the following:
   in a plurality of consecutive detection periods, a difference between power of a first preset symbol and power of a second preset symbol in the M3 middle RBs of the uplink subframe received by the base station is greater than a first threshold; or
   in a plurality of consecutive detection periods, an average value of interference noise, in the M3 middle RBs, of all uplink subframes received by the base station is greater than a second threshold.

4. The method according to claim 1, wherein the N symbols comprise:
   at least one symbol in the special subframe; or
   at least one symbol in the special subframe and at least one symbol in a downlink subframe adjacent to the special subframe.

5. The method according to claim 1, wherein the M1 middle RBs of the N symbols carry at least one of the following:
   a cell-specific reference signal in the special subframe;
   a synchronization signal in the special subframe;
   a paging message in a downlink subframe;
   system information in a downlink subframe;
   a physical broadcast channel (PBCH) in a downlink subframe;
   a synchronization signal in a downlink subframe; or
   a cell-specific reference signal in a first slot in a downlink subframe.

6. The method according to claim 1, wherein M1 is equal to 6.

7. A base station, wherein the base station comprises:
   at least one processor, the at least one processor configured to determine that co-channel interference exists; and
   a transceiver, the transceiver configured to:
   send, for N consecutive symbols before a guard period (GP) in a special subframe in a radio frame, a signal by using M1 middle resource blocks (RBs) of the N symbols;
   reserve use of RBs other than the M1 RBs in the N symbols, wherein both N and M1 are positive integers; and
   reserve use of M2 middle RBs of a target uplink subframe in the radio frame, wherein M2 is a positive integer greater than or equal to M1, and wherein the target uplink subframe comprises:
   an uplink subframe adjacent to the special subframe; or
   an uplink subframe adjacent to the special subframe and an uplink subframe with an interval of at least one subframe from the special subframe.

8. The base station according to claim 7, wherein the at least one processor is configured to:
   measure M3 middle RBs of a received uplink subframe to obtain a measurement result, wherein M3 is a positive integer less than or equal to M1; and
   determine that co-channel interference exists when the measurement result meets a preset co-channel interference condition.

9. The base station according to claim 8, wherein the preset co-channel interference condition comprises at least one of the following:
   in a plurality of consecutive detection periods, a difference between power of a first preset symbol and power of a second preset symbol in the M3 middle RBs of the received uplink subframe is greater than a first threshold; or in a plurality of consecutive detection periods, an average value of interference noise, in the M3 middle RBs, of all received uplink subframes is greater than a second threshold.

10. The base station according to claim 7, wherein the N symbols comprise:
   at least one symbol in the special subframe; or
   at least one symbol in the special subframe and at least one symbol in a downlink subframe adjacent to the special subframe.

11. The base station according to claim 7, wherein the M1 middle RBs of the N symbols carry at least one of the following:
   a cell-specific reference signal in the special subframe;
   a synchronization signal in the special subframe;
   a paging message in a downlink subframe;
   system information in a downlink subframe;
   a physical broadcast channel (PBCH) in a downlink subframe;
   a synchronization signal in a downlink subframe; or
   a cell-specific reference signal in a first slot in a downlink subframe.

12. The base station according to claim 7, wherein M1 is equal to 6.

13. A non-transitory computer readable storage medium, wherein the non-transitory computer readable storage medium stores a program, and when executed by at least one processor, the program is configured to perform:
   determining that co-channel interference exists;
   sending, for N consecutive symbols before a guard period (GP) in a special subframe in a radio frame, a signal by using M1 middle resource blocks (RBs) of the N symbols, and reserving use of RBs other than the M1 RBs in the N symbols, wherein both N and M1 are positive integers; and
   reserving use of M2 middle RBs of a target uplink subframe in the radio frame, wherein M2 is a positive integer greater than or equal to M1, and wherein the target uplink subframe comprises:
      an uplink subframe adjacent to the special subframe; or
      an uplink subframe adjacent to the special subframe and an uplink subframe with an interval of at least one subframe from the special subframe.

14. The non-transitory computer readable storage medium according to claim 13, wherein the determining that co-channel interference exists comprises:
   measuring M3 middle RBs of a received uplink subframe, to obtain a measurement result, wherein M3 is a positive integer less than or equal to M1; and
   determining that co-channel interference exists when the measurement result meets a preset co-channel interference condition.

15. The non-transitory computer readable storage medium according to claim 14, wherein the preset co-channel interference condition comprises at least one of the following:
   in a plurality of consecutive detection periods, a difference between power of a first preset symbol and power of a second preset symbol in the M3 middle RBs of the received uplink subframe is greater than a first threshold; or
   in a plurality of consecutive detection periods, an average value of interference noise, in the M3 middle RBs, of all received uplink subframes is greater than a second threshold.

16. The non-transitory computer readable storage medium according to claim 13, wherein the N symbols comprise:
   at least one symbol in the special subframe; or
   at least one symbol in the special subframe and at least one symbol in a downlink subframe adjacent to the special subframe.

17. The non-transitory computer readable storage medium according to claim 13, wherein the M1 middle RBs of the N symbols carry at least one of the following:
   a cell-specific reference signal in the special subframe;
   a synchronization signal in the special subframe;
   a paging message in a downlink subframe;
   system information in a downlink subframe;
   a physical broadcast channel (PBCH) in a downlink subframe;
   a synchronization signal in a downlink subframe; or
   a cell-specific reference signal in a first slot in a downlink subframe.

* * * * *